(12) United States Patent
Chen

(10) Patent No.: US 8,700,952 B2
(45) Date of Patent: *Apr. 15, 2014

(54) SYSTEM AND METHOD FOR COMPLETENESS OF TCP DATA IN TCP HA

(75) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/282,233

(22) Filed: Oct. 26, 2011

(65) Prior Publication Data

US 2012/0042205 A1    Feb. 16, 2012

Related U.S. Application Data

(63) Continuation of application No. 11/872,508, filed on Oct. 15, 2007, now Pat. No. 8,051,326.

(60) Provisional application No. 60/882,653, filed on Dec. 29, 2006.

(51) Int. Cl.
*G06F 11/00* (2006.01)

(52) U.S. Cl.
USPC ............................................. 714/13

(58) Field of Classification Search
USPC ........ 714/4.1, 4.11, 4.12, 4.2, 6.13, 6.3, 6.32, 714/11–16, 18, 19
See application file for complete search history.

(56) References Cited

U.S. PATENT DOCUMENTS

| | | | |
|---|---|---|---|
| 5,541,927 A | 7/1996 | Kristol et al. | |
| 6,182,139 B1 | 1/2001 | Brendel | |
| 6,247,059 B1 | 6/2001 | Johnson et al. | |
| 6,751,191 B1 | 6/2004 | Kanekar et al. | |
| 6,853,617 B2 | 2/2005 | Watson et al. | |
| 6,865,591 B1 * | 3/2005 | Garg et al. | 709/201 |
| 6,910,148 B1 | 6/2005 | Ho et al. | |
| 6,938,179 B2 * | 8/2005 | Iyer et al. | 714/4.4 |
| 7,061,858 B1 | 6/2006 | Di Benedetto et al. | |
| 7,116,634 B1 | 10/2006 | Hanselmann | |
| 7,515,525 B2 * | 4/2009 | Appanna et al. | 370/217 |

(Continued)

FOREIGN PATENT DOCUMENTS

| | | |
|---|---|---|
| CN | 1567919 A | 1/2005 |
| CN | 1832483 | 9/2006 |
| EP | 1331771 A1 | 7/2003 |
| WO | WO 2005/048508 A2 | 5/2005 |

OTHER PUBLICATIONS

White, Ron, "How Computers Work", Que Publishing (print date 2003) seventh edition, copyright (2004) p. 9 and pp. 16-17, (4 pages), ISBN: 0-7897-3003-2.

(Continued)

*Primary Examiner* — Nadeem Iqbal
(74) *Attorney, Agent, or Firm* — Slater & Matsil, L.L.P.

(57) ABSTRACT

System and method for completeness of transmission control protocol (TCP) high availability (HA) are disclosed. The system includes an active processor, having an application and a TCP, and a standby processor, having another application and another TCP; wherein communications among the active application, the active TCP, the standby application and the standby TCP quickly and efficiently enable the system seamlessly switching over from the active processor to the standby processor for transmission of incoming TCP data streams and outgoing TCP data streams if the active processor fails.

16 Claims, 6 Drawing Sheets

(56) References Cited

U.S. PATENT DOCUMENTS

| | | | |
|---|---|---|---|
| 7,549,078 B2* | 6/2009 | Harvey et al. | 714/4.11 |
| 7,562,363 B1 | 7/2009 | Belair et al. | |
| 7,609,617 B2* | 10/2009 | Appanna et al. | 370/216 |
| 7,974,315 B2 | 7/2011 | Yan et al. | |
| 8,051,326 B2 | 11/2011 | Chen | |
| 2002/0093981 A1* | 7/2002 | Turina et al. | 370/467 |
| 2002/0107966 A1* | 8/2002 | Baudot et al. | 709/227 |
| 2003/0161271 A1 | 8/2003 | Ku et al. | |
| 2003/0218982 A1 | 11/2003 | Folkes et al. | |
| 2004/0042395 A1 | 3/2004 | Lu et al. | |
| 2004/0153700 A1 | 8/2004 | Nixon et al. | |
| 2005/0213498 A1 | 9/2005 | Appanna et al. | |
| 2005/0289391 A1* | 12/2005 | Ichikawa et al. | 714/13 |
| 2006/0062142 A1* | 3/2006 | Appanna et al. | 370/219 |
| 2006/0159011 A1 | 7/2006 | Dalal et al. | |
| 2006/0233182 A1 | 10/2006 | Appanna et al. | |
| 2006/0262734 A1 | 11/2006 | Appanna et al. | |
| 2007/0064698 A1 | 3/2007 | Appanna | |
| 2007/0086461 A1 | 4/2007 | Ward et al. | |
| 2007/0180311 A1 | 8/2007 | Harvey et al. | |
| 2008/0016386 A1* | 1/2008 | Dror et al. | 714/4 |
| 2008/0159325 A1 | 7/2008 | Chen et al. | |
| 2008/0163248 A1* | 7/2008 | Chen | 719/313 |

OTHER PUBLICATIONS

Wikipedia: Motherboard or Mainboard, printed on Aug. 20, 2012, 1 page.
Wikipedia: Multicast, printed on Aug. 17, 2012, 4 pages.
Thesaurus.com: Synonyms: Concurrent, printed on Aug. 20, 2012, 3 pages.
"Transmission Control Protocol," Darpa Internet Program, Protocol Specification, RFC 793 [updated by RFC 1122] (Sep. 1981), 90 pages, Information Science Institute, University of Southern California.
"Requirements for Internet Hosts—Communication Layers," Network Working Group, Internet Engineering Task Force, RFC 1122 [updates RFC 793] (Oct. 1989), 116 pages.
PCT Search Report and PCT Written Opinion of Application No. PCT/CN2007/071383, date of mailing Apr. 24, 2008, 9 pages.
IEEE Article "A Reliable Multicast Framework for Light-weight Session and Application Level Framing" (Dec. 1997), pp. 1-19 to Floyd et al. ("Floyd").
European Search Report, Application No. PCT/CN2007/071383, date of mailing Dec. 3, 2009, Applicant Huawei Technologies Co., Ltd., 11 pages.
First Chinese Office Action of Chinese Application No. 2007/80048786.2, dated Aug. 24, 2011, with partial translation, 10 pages.
Andersson, L., et al., "LDP Specification," RFC 3036, The Internet Society, Jan. 2001, 124 pages.
Awduche, D., et al., "RSVP-TE: Extensions to RSVP for LSP Tunnels," RFC 3209, The Internet Society, Dec. 2001, 57 pages.
Rekhter, Y., et al., "A Border Gateway Protocol 4 (BGP-4)," RFC 1771, IETF, Mar. 1995, 54 pages.
Vahid, F., "The Softening of Hardware," IEEE Computer Society, Computer, vol. 36, Issue 4, Apr. 2003, pp. 27-34.
McConnell, S., "Who Needs Software Engineering?," IEEE Software, vol. 18, Issue 1, Jan./Feb. 2001, pp. 5-8.
Tanenbaum, A., "Structured Computer Organization," Second Edition, 1984, Prentice-Hall, Inc., Englewood Cliffs, NJ, 5 pages.
Cisco & Cisco Router, Network Switch, "What is Cisco Chassis, Backplane, and Line Card?," Dec. 30, 2011, 2 pages.
Sheth, Purnam A., "Build High Availability Into Your IP Network: Part 1," Communication Systems Design, Jan. 2003, pp. 25-28.
World Wide Web, http://computer.yourdictionary.com/line-card, "Line Card—Technical Definition," printed on Jan. 7, 2013, 1 page.
World Wide Web, http://publib.boulder.ibm.com/infocenter/zos/v1r11/topic/com.ibm.zos.r11.hala001/f1a1d48004.htm, IBM, printed on Jan. 7, 2013, 2 pages.

\* cited by examiner

SYSTEM AND METHOD FOR COMPLETENESS OF TCP DATA IN TCP HA

This application is a continuation of U.S. patent application Ser. No. 11/872,508, entitled "System and Method for Completeness of TCP Data in TCP HA," filed on Oct. 15, 2007, which claims the benefit of U.S. Provisional Application Ser. No. 60/882,653, entitled "System and method for completeness of TCP data in TCP HA," filed on Dec. 29, 2006, which applications are hereby incorporated herein by reference.

TECHNICAL FIELD

The present invention relates generally to network communications, and more particularly, to a system comprising various methods and constructs for the completeness of Transmission Control Protocol (TCP) data messages in TCP High Availability (HA).

BACKGROUND

Transmission Control Protocol (TCP) is a lower level connection protocol. TCP is used in a router by higher level routing protocols, such as Border Gateway Protocol (BGP), for setting up connections with peer routers and exchanging route information with them. In a router with an Active Main Board (AMB) and a Standby Main Board (SMB), TCP and other protocols, such as BGP and Label Distribution Protocol (LDP), run on AMB and SMB. AMB and SMB may also be called active processor and standby processor respectively. TCP High Availability (HA) provides support for the high availability of those protocols that use TCP. When AMB fails, SMB may take over the role as a new AMB smoothly if TCP and other protocols have the high availability capability. The completeness of TCP data messages in TCP HA is a critical part for AMB to be well protected by SMB.

The completeness of TCP data messages in TCP HA mainly involves handling for incoming and outgoing TCP data streams. For an incoming TCP data stream, the completeness makes sure that the application in SMB receives the incoming TCP data from the beginning of an application message when it starts to accept the data. From the beginning point of the incoming data stream, the application in SMB may get continuous data that contains whole application messages. For an outgoing TCP data stream, the completeness guarantees that the application in SMB obtains the outgoing TCP data originated from the corresponding application in AMB from the beginning of an application message when it starts to snoop the outgoing TCP data. From that beginning point of the outgoing data stream, the application in SMB may get continuous data that contains whole application messages. When a failure in AMB happens, a procedure called switch over from AMB to SMB is triggered, during which SMB takes over the role as a new AMB, the completeness makes sure that the transmission of every incoming and outgoing TCP data stream is seamlessly switched over from AMB to SMB, that is, the whole application messages flowing continuously are sent to the peer router from every outgoing TCP data stream in the new AMB and these whole application messages are delivered to the application in the new AMB from every incoming TCP data stream. A switch over from AMB to SMB may also be triggered when a "switch over" command is issued by a user.

Conventional systems and methods for the completeness of TCP data messages in TCP High Availability (HA) use explicit application message boundary notifications. For an incoming TCP data stream associated with a socket, an application using this TCP socket in AMB must recognize at which particular message boundary the corresponding application in SMB will begin to receive the duplicate application messages on the corresponding replica socket. The boundary information, corresponding to a sequence number for the last byte of an application message, is forwarded to TCP in AMB, which passes the sequence number to TCP in SMB. TCP in SMB may start to deliver the incoming TCP data to the corresponding application in SMB according to the sequence number. For an outgoing TCP data stream associated with a socket, the application using this TCP socket in AMB identifies at what point each application message boundary is, and the application passes this boundary information to TCP through the socket. TCP in AMB sends the message with this additional information to TCP in SMB, which interprets and strips the additional information and sends the message to the corresponding application in SMB.

The conventional systems and methods may encounter a number of problems. For example, an application using TCP for receiving incoming data notifies TCP, application message boundary information in the condition that the last byte that the application receives from TCP is the boundary of a message. In some situations, it may wait for a long time for the condition to be satisfied. Thus it may take a long time for AMB to become fully protected by SMB. Another shortcoming of the conventional systems and methods is, that applications using TCP for sending data must tell TCP application message boundary information for every piece of data written to TCP. In addition, TCP needs to be enhanced to accept the boundary information from the applications.

Therefore, there is a need of systems and methods for the completeness of TCP data messages in TCP HA that works more efficiently, simplifies the interface and interactions between application and TCP, and minimizes changes in TCP and applications using TCP.

SUMMARY OF THE INVENTION

The present invention discloses versatile systems and methods for the completeness of TCP data messages in TCP High Availability (HA). The embodiments of the present invention substantially reduce waiting time for TCP in SMB to deliver the TCP data to application from the beginning of an application message; minimize changes in TCP and applications using TCP. Moreover, for both incoming TCP data streams and outgoing TCP data streams, applications using TCP in AMB may not be required to send any boundary information to TCP explicitly. An application in AMB notifies TCP only once that SMB is ready to protect AMB for TCP data streams.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF ILLUSTRATIVE EMBODIMENTS

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1:
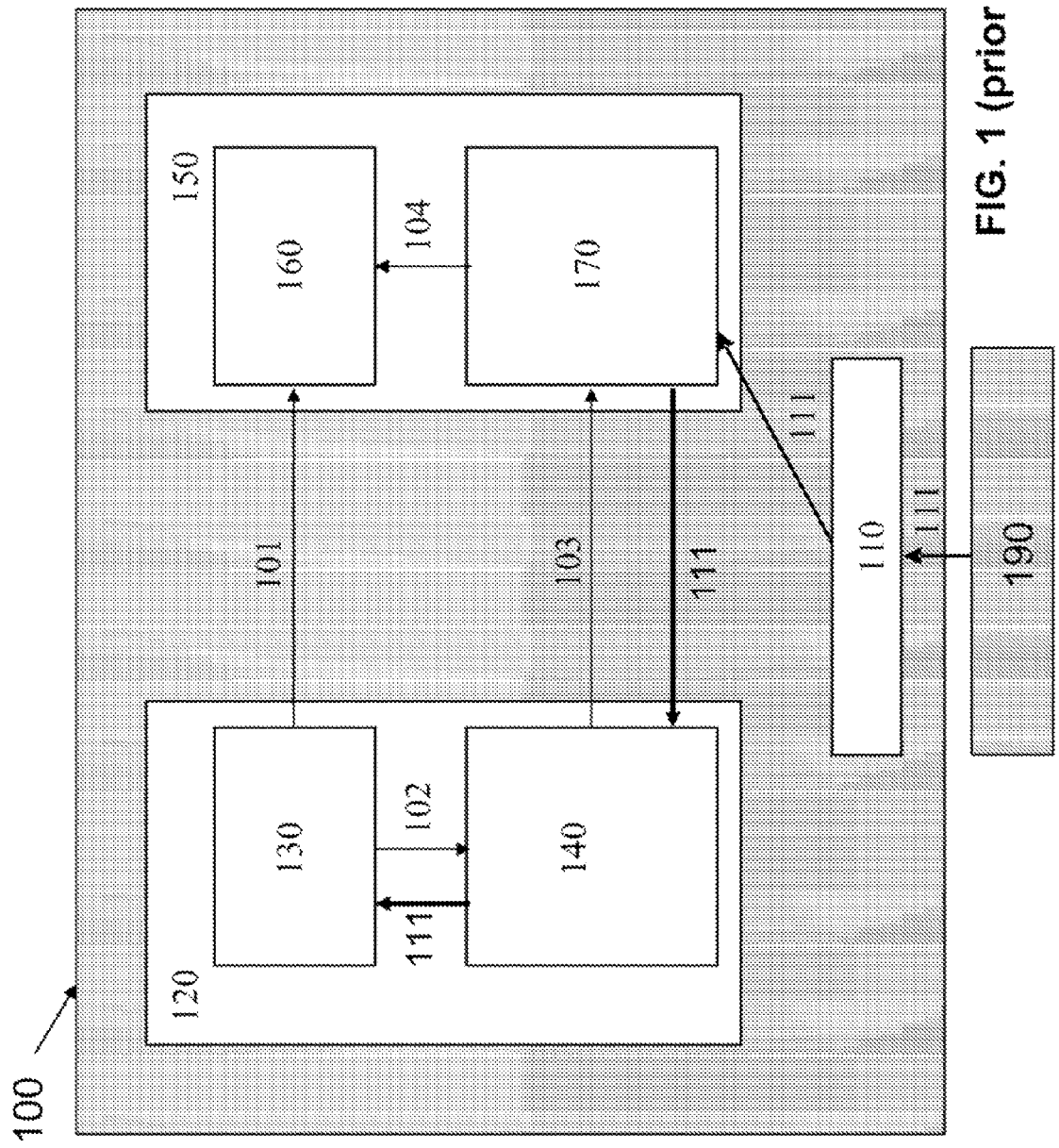
FIG. 1 is a schematic diagram of a system illustrating completeness for an incoming data stream in prior art.

FIG. 1 is a schematic diagram of a system 100 illustrating completeness for an incoming data stream 111 in prior art. In FIG. 1, System 100 includes an Active Main Board (AMB) 120, a Standby Main Board (SMB) 150, and a Line Card (LC) 110. AMB 120 includes an Active Application 130 and an Active Transmission Control Protocol (TCP) 140, SMB 150 includes a Standby Application 160 and a Standby TCP 170. The incoming Data Stream 111 comes to the system 100 through LC 110 from a Peer Router 190. Standby Application 160 provides protection for Active Application 130 and Standby TCP 170 provides protection for Active TCP 140. When AMB 120 fails, Standby Application 160 and Standby TCP 170 may take the role of Active Application 130 and Active TCP 140 respectively. SMB 150 may become a new AMB. For the incoming TCP data stream 111, its completeness is achieved through Active Application 130 identifying message boundaries to TCP 140 via a socket, and Active TCP 140 forwarding the boundary information to Standby TCP 170.

As illustrated in FIG. 1, Active Application 130 receives TCP data from incoming TCP data stream 111 through a socket associated with the data stream 111. Active Application 130 creates and updates the data structures and states according to the data received. In order for Standby Application 160 to receive the duplicate TCP data from the same incoming TCP data stream 111 and to generate the same data structures and states as those generated by Active Application 130, a duplicate socket is created in SMB 150 at Step 101. After the duplicate socket in Standby TCP 170 reaches a consistent state with the socket in Active TCP 140, and the data structures and states in Standby Application 160 are synchronized with those in Active Application 130, Standby TCP 170 then delivers, to Standby Application 160, the data from the beginning of a message, and not from the middle of a message, through the duplicate socket. Active Application 130 recognizes at which particular message boundary Standby Application 160 may begin to receive the duplicate messages on the duplicate socket. Active Application 130 identifies the boundary of a message that only Active Application 130 receives, the last byte of the message. The incoming TCP data after this message may be received by both Active Application 130 and Standby Application 160. Active Application 130 then forwards the boundary information (corresponding to a sequence number) to Active TCP 140 at Step 102, which passes the sequence number to Standby TCP 170 at Step 103. Standby TCP 170 discards all the messages received from the incoming TCP data stream 111 prior to the sequence number, but starts to deliver the data to Standby Application 160 at Step 104 after the boundary sequence number.

Figure 2:
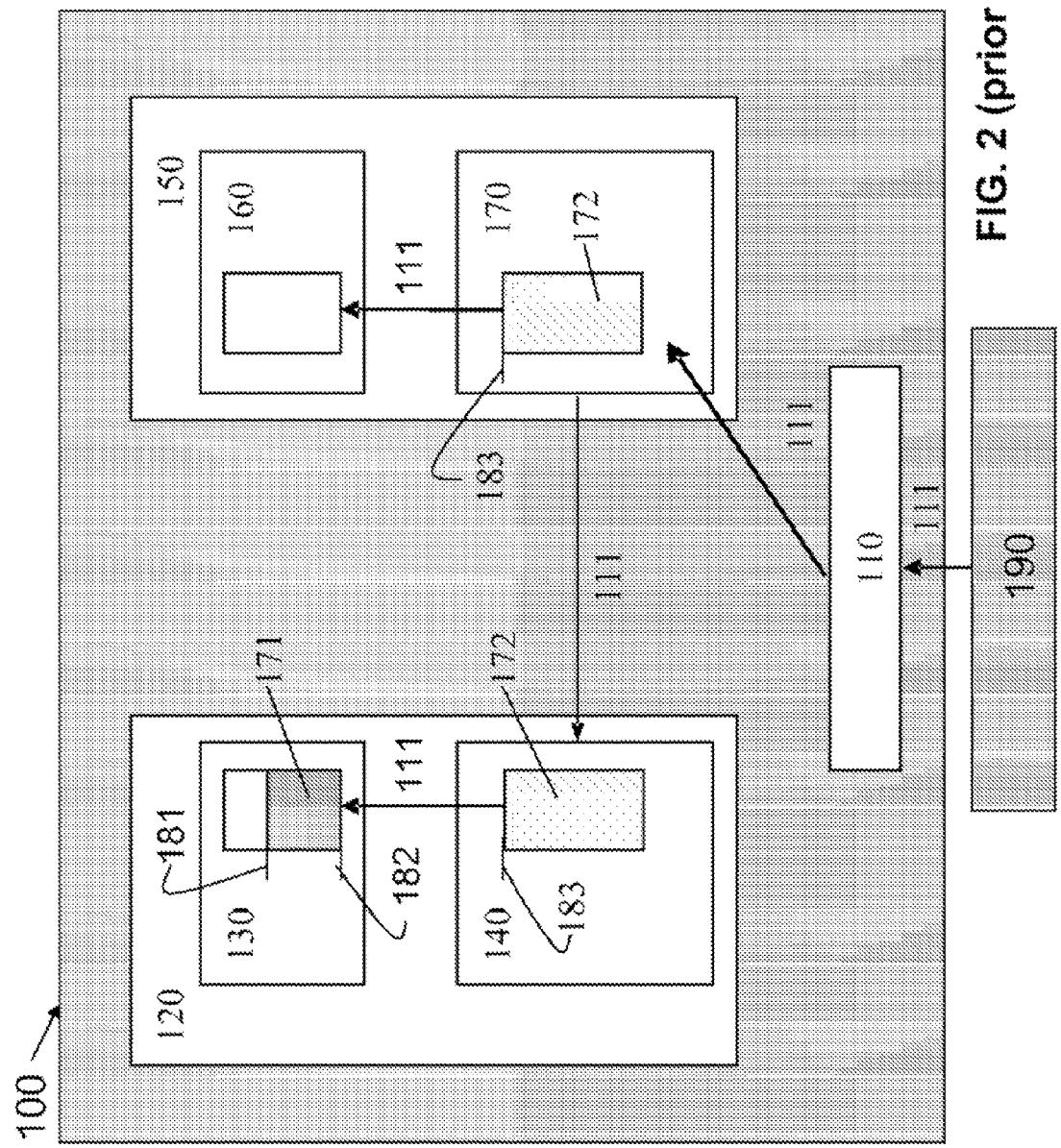
FIG. 2 is a schematic diagram illustrating the system for completeness of the incoming data stream utilizing boundary of an application message in prior art.

FIG. 2 is a schematic diagram illustrating System 100 for completeness of the incoming data stream 111 utilizing boundary of an application message in prior art. In FIG. 2, System 100 includes an AMB 120, an SMB 150, and an LC 110. AMB 120 includes an Active Application 130 and an Active TCP 140; and SMB 150 includes a Standby Application 160 and a Standby TCP 170. The incoming data stream 111 comes to the system 100 through LC 110 from Peer Router 190. For the incoming TCP data stream 111, its completeness is achieved through Active Application 130 identifying message boundaries to Active TCP 140 via socket, and Active TCP 140 forwarding the boundary information to Standby TCP 170.

FIG. 2 illustrates two messages 171 and 172 coming to System 100, Message 171 has a first byte 181 and a last byte 182 follows by a first byte 183 of Message 172. In the prior art, the end of an input buffer of Active Application 130 is the boundary, the last byte 182, of Message 171. For example, the last byte 182 of the Message 171 corresponds to sequence number "m". After Active Application 130 recognizes the last byte 182 (corresponding to sequence number "m"), the boundary of Message 171, Active Application 130 notifies Active TCP 140 the boundary information. Active TCP 140 then forwards the boundary information to Standby TCP 170, which starts to send the incoming TCP data to Standby Application 160 from sequence number "m+1", corresponding to the first byte 183 of Message 172, according to the boundary information after SMB 150 is notified to back up AMB 120 in real time.

Figure 3:
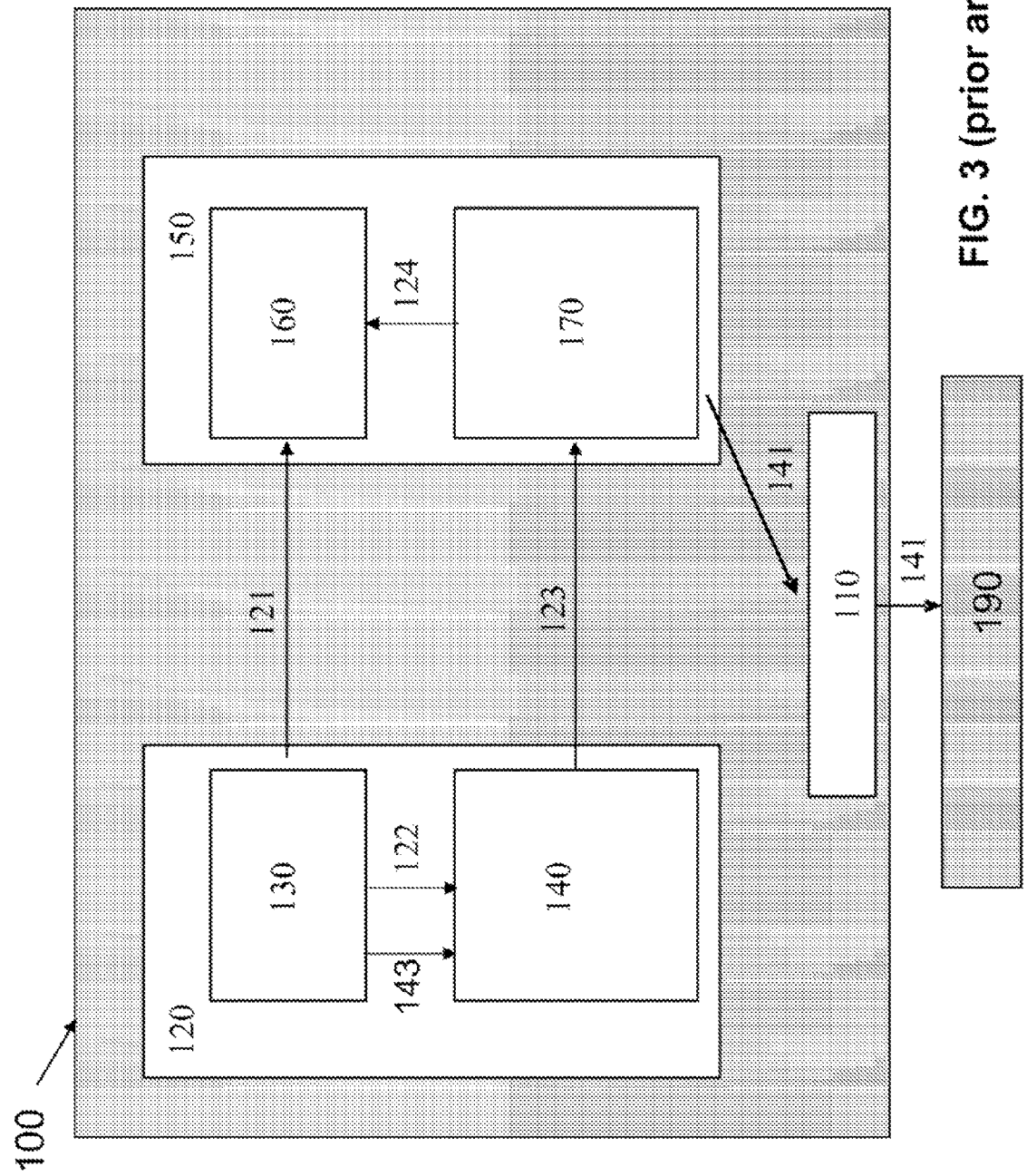
FIG. 3 is a schematic diagram illustrating the system for completeness of an outgoing TCP data stream in prior art.

FIG. 3 is a schematic diagram illustrating System 100 for completeness of an outgoing TCP data stream 141 in prior art. For the outgoing TCP data stream 141 associated with a socket, Active Application 130 duplicates the socket to Standby Application 160 at Step 121, identifies at what points the boundaries of the messages may be, and passes the boundary information through the socket to Active TCP 140 at Step 122. Active TCP 140 encapsulates the messages coming from Active Application 130 at Step 143 with the boundary information, and transmits the encapsulated messages to Standby TCP 170 at Step 123. Standby TCP 170 interprets and strips the boundary information and sends the messages to Standby Application 160 at Step 124, then further sends the messages to Peer Router 190 through LC 110. The boundary information may include the identification of the boundaries.

Figure 4:
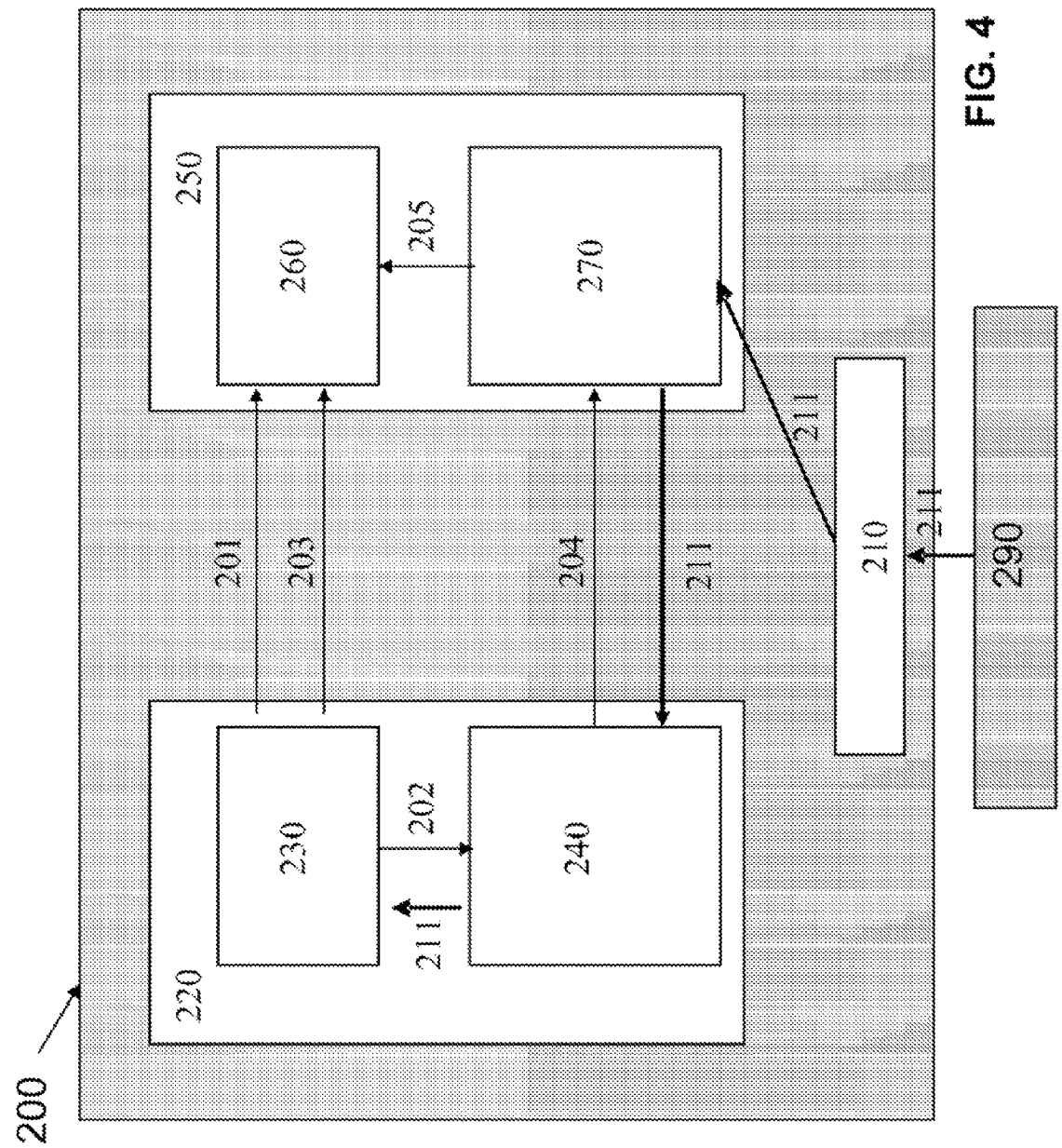
FIG. 4 is a schematic diagram illustrating a TCP HA System for completeness of an incoming data stream according to the present invention.

FIG. 4 is a schematic diagram illustrating a TCP HA System 200 for completeness of an incoming data stream 211 according to the present invention. In FIG. 4, System 200 includes an AMB 220, an SMB 250, and an LC 210. AMB 220 includes an Active Application 230 and an Active TCP 240; and SMB 250 includes a Standby Application 260 and a Standby TCP 270. An incoming Data Stream 211 comes to the system 200 through LC 210 from a Peer Router 290. In the embodiments of the present invention, TCP HA System 200 may be provided in a pair of control processors in a router, one working as an active processor, while the other is a standby processor. The active processor provides normal functions and the standby processor provides backup protection. Within TCP HA system 200, AMB 220 may be referred to as an active processor having Active TCP 240 in conjunction with Active Application 230; and SMB 250 may be referred to as a standby processor having Standby TCP 270 in conjunction with Standby Application 260. In another embodiment, AMB 220 may be referred to as an active set of processes that includes Active TCP 240 and Active Application 230, and SMB 250 may be referred to as a standby set of processes that includes Standby TCP 270 and Standby Application 260. These two sets of processes may run on a processor. When a switch over is triggered from AMB 220 to SMB 250, SMB 250 takes over the role of AMB 220 as a new AMB to provide normal functions for the system 200 and TCP data transmission is switched over seamlessly from AMB 220 to SMB 250.

For the incoming TCP data stream 211 associated with a socket in Active Application 230, the socket is duplicated in Standby Application 260 at Step 201. Standby Application 260 may receive duplicate incoming TCP data messages from any message after a consistent point, at which the duplicate socket in SMB 250 reaches a consistent state at TCP level with the socket in AMB 220 and the data structures and states in Standby Application 260 are synchronized with those in Active Application 230.

At Step 202, Active Application 230 notifies Active TCP 240 that Standby Application 260 is ready to receive incoming TCP data after the duplicate socket in SMB 250 reaches a consistent state with the socket in AMB 220 at TCP level, and the data and states of Active Application 230 are synchronized with those of Standby Application 260.

At Step 203, Active Application 230 copies the data from a TCP input buffer of Active Application 230 to Standby Application 260. Active Application 230 makes sure that the beginning of the buffer to be copied is the boundary of a message. This may be achieved as soon as Active Application 230 decodes a complete message in the TCP input buffer; the point following the message is the beginning of another message, which may be the beginning of the buffer to be copied, providing that the next message starts immediately after the decoded message.

At Step 204, Active TCP 240 sends, to Standby TCP 270, a sequence number, for example "u", corresponding to the last byte of the data delivered to Active Application 230, right before Active TCP 240 receives a notification that Standby Application 260 is ready to receive the incoming TCP data or the TCP HA system 200 needs SMB 250 to back up AMB 220 for the incoming data stream 211 in real time.

At Step 205, Standby TCP 270 sends, to Standby Application 260, the incoming TCP data from sequence number "u+1" after SMB 250 is notified to back up AMB 220 in real time.

As illustrated in FIG. 4, in one embodiment, the incoming data stream 211 is sent first to SMB 250 and then to AMB 220, such that both SMB 250 and AMB 220 may be synchronized for every incoming message and state change. There are other data flow configurations for an incoming data stream on which TCP HA may be based. For example, the incoming data stream 211 may be sent to both SMB 250 and AMB 220 simultaneously, such that both SMB 250 and AMB 220 may maintain duplicate set of incoming data and states. The embodiments of the present invention for completeness of incoming data streams are not dependent on the particular manner in which the incoming data streams flow in TCP HA system 200. The present invention may be applicable to TCP HA system 200 based on an incoming data stream flowing through SMB 250 to AMB 220. It may also be applicable to TCP HA system 200 based on other configurations of incoming data stream flows.

Figure 5:
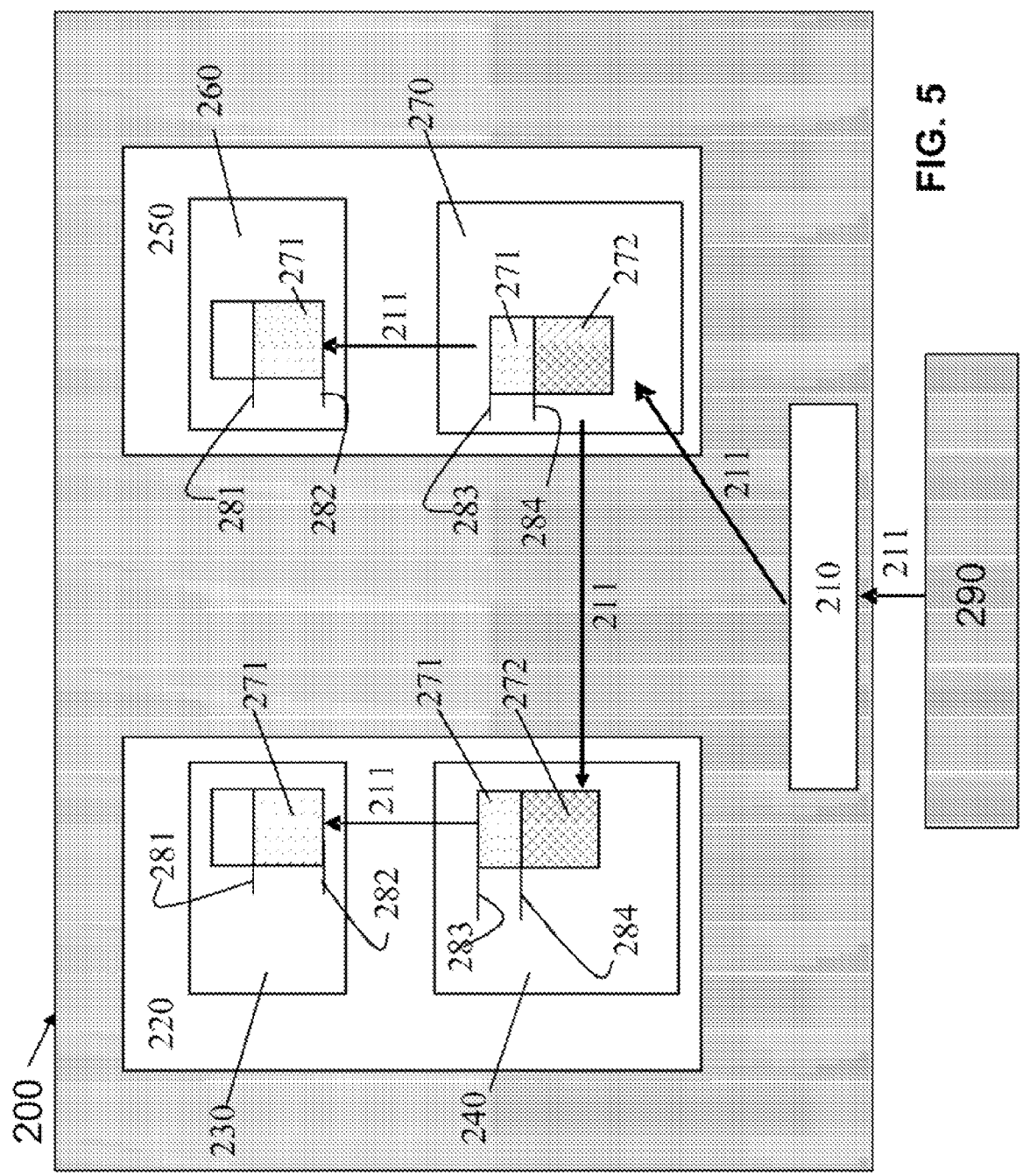
FIG. 5 is a schematic diagram illustrating the TCP HA System for completeness of the incoming data stream utilizing a combination of a TCP input buffer and the incoming data stream from a peer router according to the present invention.

FIG. 5 is a schematic diagram illustrating the TCP HA System 200 for completeness of the incoming data stream 211 utilizing a combination of a TCP input buffer and an incoming data from Peer Router 290 according to the present invention. In FIG. 5, System 200 includes AMB 220, SMB 250, and LC 210. AMB 220 includes Active Application 230 and Active TCP 240; and SMB 250 includes Standby Application 260 and Standby TCP 270. The incoming data stream 211 comes to the system 200 through LC 210 from Peer Router 290.

In the embodiment illustrated in FIG. 5, two messages 271, 272 are received by System 200, Message 271 has a first byte 281 and a last byte 284 follows by Message 272. Message 271 contains byte 282 and byte 283; neither byte 282 nor byte 283 is a last byte of Message 271.

For the incoming TCP data stream 211 associated with a socket in Active Application 230, the socket is duplicated in Standby Application 260 as illustrated in FIG. 4. Standby Application 260 may receive duplicate incoming TCP data messages from any message after a consistent point, at which the duplicate socket in SMB 250 reaches a consistent state at TCP level with the socket in AMB 220, and the data structures and states in Standby Application 260 are synchronized with those in Active Application 230.

In the embodiment illustrated in FIG. 5, Active Application 230 notifies Active TCP 240, that Standby Application 260 is ready to receive incoming TCP data, and copies the data in its TCP input buffer to Standby Application 260 as illustrated in FIG. 4. The beginning of the data in the buffer to be copied is the beginning of an application message, that is, the first byte 281 of Message 271. The end of the buffer, byte 282, is not the boundary of Message 271. After receiving the notification that Standby Application 260 is ready to receive the incoming TCP data stream 211 or TCP HA system 200 needs SMB 250 to back up AMB 220 in real time, Active TCP 240 sends, to Standby TCP 270, a sequence number "u", corresponding to byte 282 of Message 271 delivered to Active Application 230 right before the notification received. Then Standby TCP 270 sends, to Standby Application 260, the incoming TCP data from sequence number "u+1", corresponding to byte 283 of Message 271, after SMB 250 is notified to back up AMB 220 in real time.

Active TCP 240 and Standby TCP 270 start to synchronize the data from sequence number "u+1", i.e. byte 283. If Standby TCP 270 does not have the data that starts from a sequence number "k", where "k" is greater than "u+1", then Standby TCP 270 may request the missing data from Active TCP 240.

The data copied from the TCP input buffer of Active Application 230, e.g. a first part of Message 271, and the incoming data from sequence number "u+1" in the buffer of Standby TCP 270, e.g. a second part of Message 271 and Message 272, followed by the data from Peer Router 290, form a complete incoming TCP data stream. This complete data stream starts from the beginning of a message (e.g. Message 271). Thus, the data in the TCP input buffer of Standby Application 260, the data in the input buffer of Standby TCP 270, and the incoming data from Peer Router 290 form a continuous incoming TCP data stream in SMB 250 for the socket duplicated from AMB 220. In the embodiments of the present invention, when a switch over from AMB 220 to SMB 250 is triggered, SMB 250 takes over the role of AMB 220 as a new AMB and Standby Application 260 just keeps receiving the continuous incoming TCP data stream, thus the transmission of the incoming TCP data steam is switched over seamlessly from AMB 220 to SMB 250.

When a switch over from AMB 220 to SMB 250 is triggered, SMB 250 becomes a new AMB, thus providing a protection for AMB 220. Consequently, AMB 220 becomes a new SMB, and a switch over from SMB 250 to AMB 220 may be triggered and performed with a similar method described in the embodiments of the present invention.

Figure 6:
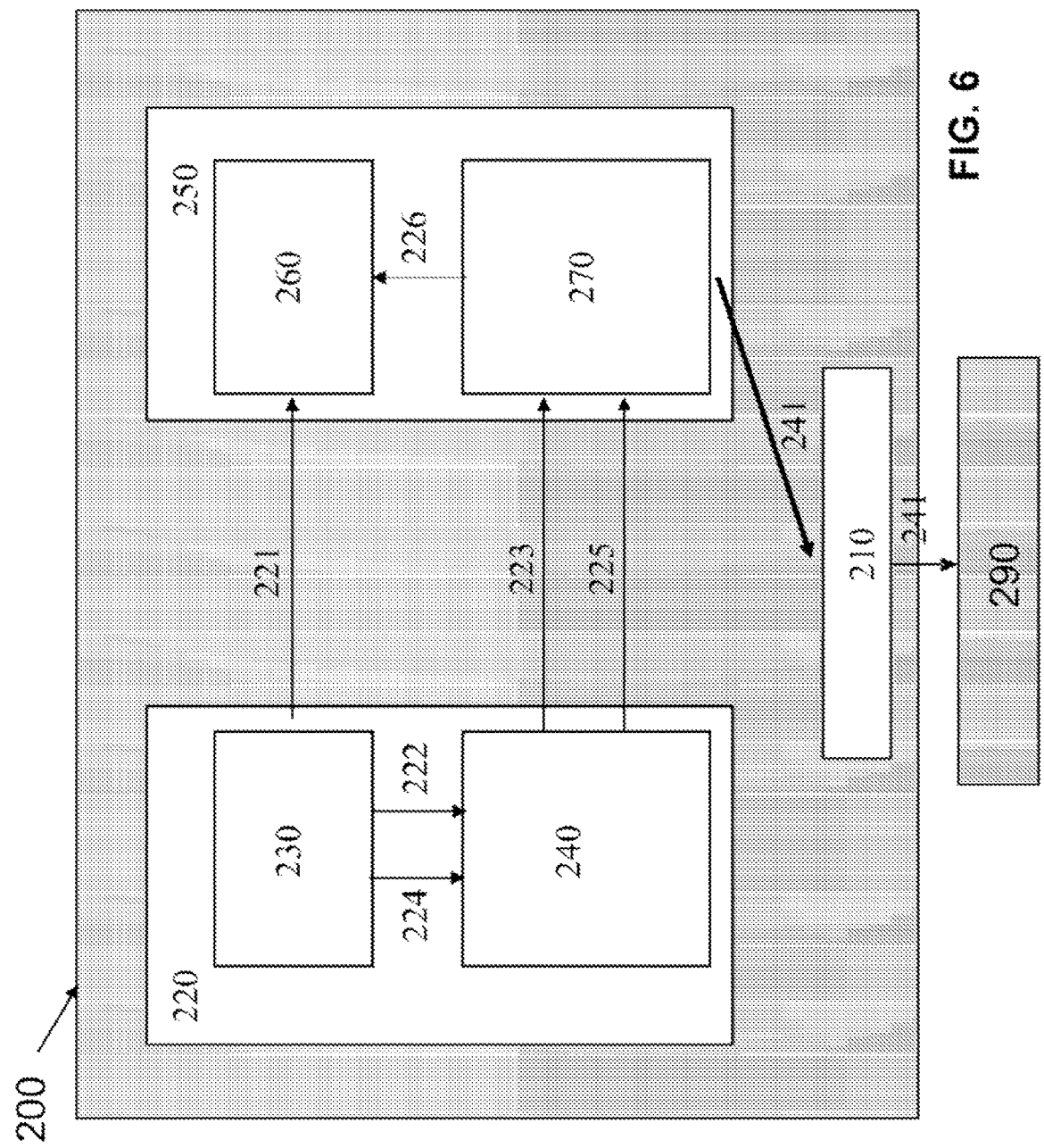
FIG. 6 is a schematic diagram illustrating the TCP HA System for completeness of an outgoing TCP data steam utilizing implied boundary information according to the present invention.

FIG. 6 is a schematic diagram illustrating the TCP HA System 200 for completeness of an outgoing TCP data stream 241 utilizing implied boundary information according to the present invention. In FIG. 6, System 200 includes AMB 220, SMB 250, and LC 210. AMB 220 includes Active Application 230 and Active TCP 240, SMB 250 includes Standby Application 260 and Standby TCP 270. The outgoing data stream 241 goes out of the system 200 to Peer Router 290 through LC 210.

At Step 221 in FIG. 6, a socket associated with the outgoing TCP data stream 241 in Active Application 230 is duplicated in Standby Application 260, and is created in SMB 250. Standby Application 260 may snoop the duplicate outgoing TCP data messages from any message after a certain point, at which the duplicate socket in SMB 250 reaches a consistent state at TCP level with the socket in AMB 220, and the data structures and states in Standby Application 260 are synchronized with those in Active Application 230.

After the consistent point, Active Application 230 notifies Active TCP 240 at Step 222, that Standby Application 260 is ready to snoop outgoing TCP data after the duplicate socket in SMB 250 reaches a consistent state with the socket in AMB 220 at TCP level, and the data and states of Active Application 230 are synchronized with those of Standby Application 260.

At Step 223, Active TCP 240 sends, to Standby TCP 270, a sequence number "n", corresponding to the last byte of the data delivered to Active TCP 240 by Active Application 230, right before the notification that Standby Application 260 is ready to snoop the outgoing TCP data stream 241, or TCP HA system 200 needs SMB 250 to back up AMB 220 in real time. Active Application 230 makes sure that the last byte, corresponding to the sequence number "n", is the boundary of a message.

At Step 224, Active Application 230 may continue to write the data to Active TCP 240, and Active TCP 240 stores the data into its buffer in order. Active Application 230 makes sure that the data written to Active TCP 240 contains one or more whole messages.

At Step 225, the data and the boundary information of the data is sent to Standby TCP 270. For each piece of data, the sequence number corresponding to the last byte of the data is passed to Standby TCP 270 as the boundary information for the data by Active TCP 240. The data is also transmitted to Standby TCP 270. In another embodiment, the boundary information of the data may also be implied from the length of the data and the sequence number corresponding to the last byte of the previous piece of data transmitted to Standby TCP 270 from Active TCP 240.

After receiving the data from Active TCP 240, Standby TCP 270 stores the data in its buffer in order, and at Step 226, sends the continuous data to Standby Application 260 starting from sequence number "n+1", after SMB 250 is notified to back up AMB 220 in real time. The continuous data is constructed in the buffer by means of the boundary information of each piece of data and the length of the data received from Active TCP 240.

As illustrated in FIG. 6, in one embodiment, the outgoing data stream 241 goes out through SMB 250, such that both AMB 220 and SMB 250 may be synchronized for every outgoing message and any state changes. There are other data flows for an outgoing data stream flowing on one of which TCP HA may be based. For example, the outgoing data stream 241 may go out through AMB 220 to LC 210 so long as both SMB 250 and AMB 220 may maintain duplicate sets of outgoing data streams and synchronization is maintained between SMB 250 and AMB 220. The embodiments of the present invention for completeness of outgoing data streams are independent of the ways of the outgoing data stream flowing on which TCP HA system 200 is based.

When a switch over from AMB 220 to SMB 250 is triggered, SMB 250 becomes a new AMB, thus providing a protection for AMB 220. It transmits complete messages received from AMB 220 as indicated by the boundary information in the buffer of Standby TCP 270, and starts to accept messages from Standby Application 260 through the duplicate socket. The data sent out to Peer Router 290 through LC 210, the data in the buffer of Standby TCP 270 and the data from Standby Application 260 form a continuous and complete outgoing TCP data stream. Thus, the transmission of the outgoing TCP data stream is seamlessly switched over from AMB 220 to SMB 250 in this embodiment. Consequently, AMB 220 becomes a new SMB, a switch over from SMB 250 to AMB 220 may be triggered and performed with a similar method described in the embodiments of the present invention.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A transmission control protocol (TCP) high availability (HA) system, comprising:

an active processor, having an active application and an active TCP; and a standby processor, having a standby application and a standby TCP, wherein the active processor is directly coupled to the standby processor, and wherein communications and data exchanges among the active application, the active TCP, the standby application, and the standby TCP provide a mechanism for a seamless switch over of an incoming data stream or an outgoing data stream from the active processor to the standby processor, wherein the mechanism includes duplicating a socket associated with an incoming TCP data stream from the active application in the active processor to the standby application in the standby processor, synchronizing a set of data and a set of states corresponding to the socket associated with the incoming TCP data stream between the active TCP and the standby TCP, sending a notification, from the active application, to the active TCP that the standby application in the standby processor is ready to receive data from the socket associated with the incoming TCP data stream, copying a first TCP data received from the socket associated with the incoming TCP data stream, in an input buffer of the active application in the active processor, to the standby application in the standby processor, and sending a sequence number, by the active TCP in the active processor, to the standby TCP in the standby processor, wherein the sequence number corresponds a last byte of the first TCP data delivered through the socket associated the incoming data stream to the active application right before the active TCP receives the notification.

2. The system of claim 1, wherein a beginning of the input buffer of the active application to be copied is a boundary of a message.

3. The system of claim 2, wherein the beginning of the input buffer is determined by a point following another complete message decoded in the input buffer.

4. The system of claim 1, wherein the standby TCP starts to synchronize an incoming TCP data with the active TCP from a sequence number corresponding to a next byte to the last byte of the first TCP data.

5. The system of claim 1, wherein the sequence number is not a boundary of a message.

6. The system of claim 1, wherein the sequence number is a boundary of a message.

7. The system of claim 1, wherein the notification is sent after the data and states for the socket associated with the incoming TCP data stream are synchronized between the active TCP and the standby TCP, and the data and states are synchronized between the active application and the standby application.

8. The system of claim 1, wherein the notification is sent through an option of the socket associated with the incoming TCP data stream.

9. The system of claim 1, wherein the notification to the active TCP from the active application is through a message for the socket associated with the incoming data stream in the active application.

10. A transmission control protocol (TCP) high availability (HA) system, comprising:
an active processor, having an active application and an active TCP; and
a standby processor, having a standby application and a standby TCP;
wherein the active processor is directly coupled to the standby processor;
wherein communications and data exchanges among the active application, the active TCP, the standby application, and the standby TCP provide a mechanism for a seamless switch over of an incoming data stream or an outgoing data stream from the active processor to the standby processor, wherein the mechanism includes
duplicating a socket associated with the outgoing data stream from the active application in the active processor to the standby application in the standby processor;
synchronizing data and states related to the socket associated with the outgoing data stream between the active TCP and the standby TCP;
sending a notification, by the active application, to the active TCP that the standby application in the standby processor is ready to snoop outgoing data through the socket associated with the outgoing data stream; and
sending a sequence number, by the active TCP in the active processor, to the standby TCP in the standby processor, wherein the sequence number corresponds a last byte of a first TCP data written to the active TCP by the active application right before the active TCP receives the notification.

11. The system of claim 10, wherein the sequence number is a boundary of a message.

12. The system of claim 10, wherein the standby TCP starts to synchronize the outgoing data stream with the active TCP from sequence number corresponding to a next byte to the last byte of the first TCP data.

13. The system of claim 10, wherein the notification is sent after the data and states for the socket associated with the outgoing data stream are synchronized between the active TCP and the standby TCP and the data and states are synchronized between the active application and the standby application.

14. The system of claim 10, wherein the notification is sent through an option of the socket associated with the outgoing data stream.

15. The system of claim 10, wherein the notification to the active TCP is through a message for the socket associated with the outgoing data stream.

16. The system of claim 10, wherein the mechanism further comprises, after the switch over, sending data in a buffer of the standby TCP and data from the standby application form a continuous outgoing TCP data stream, and the continuous outgoing TCP data stream to a peer router from the standby processor.

* * * * *